May 31, 1960 A. TUTCHINGS 2,938,965

MAGNETIC RECORDING AND REPRODUCING UNIT

Filed Sept. 3, 1957 2 Sheets-Sheet 1

INVENTOR
Alec Tutchings
BY
Karl W. Flocks
ATTORNEY

May 31, 1960 A. TUTCHINGS 2,938,965

MAGNETIC RECORDING AND REPRODUCING UNIT

Filed Sept. 3, 1957 2 Sheets-Sheet 2

INVENTOR

Alec Tutchings

BY

Karl W. Flocks

ATTORNEY

United States Patent Office 2,938,965

Patented May 31, 1960

2,938,965

MAGNETIC RECORDING AND REPRODUCING UNIT

Alec Tutchings, Friars Cliff, Christchurch, England, assignor to W. H. Sanders (Electronics) Limited, a company of Great Britain Filed Sept. 3, 1957, Ser. No. 681,728

Claims priority, application Great Britain Nov. 16, 1956

6 Claims. (Cl. 179—100.2)

This invention relates to a magnetic recording and reproducing unit of the type (hereinafter referred to as "the type specified") including a supply reel for holding a quantity of magnetic tape or wire, a take-up reel, driving means located on the path of the tape or wire between the supply reel and the take-up reel for unwinding tape or wire from the supply reel, means for rotating the take-up reel so that tape or wire unwound from the supply reel is wound thereon and a magnetic recording and/or reproducing head mounted for co-operation with the tape or wire between the supply reel and the driving means.

It is a desirable feature of installations of the type specified that the tape or wire should pass across the recording and reproducing head at as near a constant speed as possible and it is usual to employ motors having speed governing devices for the driving means. However, in gramophone or radiogram installations, commonly used domestically, such a speed governed motor is already incorporated and it has been proposed to provide a magnetic recording and reproducing unit of the type specified which can be driven by the motor of an existing gramophone installation. However, commercially available gramophone and radiogram installations differ considerably from one another, both as regards the physical layout of the turntable installation and also in the use of many types of automatic record change, and difficulty has been experienced in providing a magnetic recording and reproducing unit capable of co-operating with a large number of commercially available gramophone and radiogram installations.

It is therefore an object of the present invention to provide an improved magnetic recording and reproducing unit of the type specified which is inexpensive to produce and is capable of association with a large number of different gramophone installations to produce high quality recordings and reproductions. The unit is preferably for use in conjunction with a radiogram so that audio-frequency amplifying means are available both for recording and reproduction purposes.

According to the present invention there is provided a magnetic recording and reproducing unit of the type specified which is mounted upon a carrier member for association with an existing gramophone installation, the arrangement being such that part of the driving means co-operates with the turntable of the installation in the same manner as a disc-type record so that the unit and such records are readily interchangeable, the weight of the unit being wholly supported by the turntable and means being provided restraining rotation of the carrier member with the turntable.

Preferably the carrier member extends across the turntable and projects beyond it at one of its ends and said restraining means is located adjacent said end for securing the carrier relative to a fixed part of the gramophone installation.

One structural form of the invention will now be described with reference to the accompanying drawing, in which.

Figure 1:
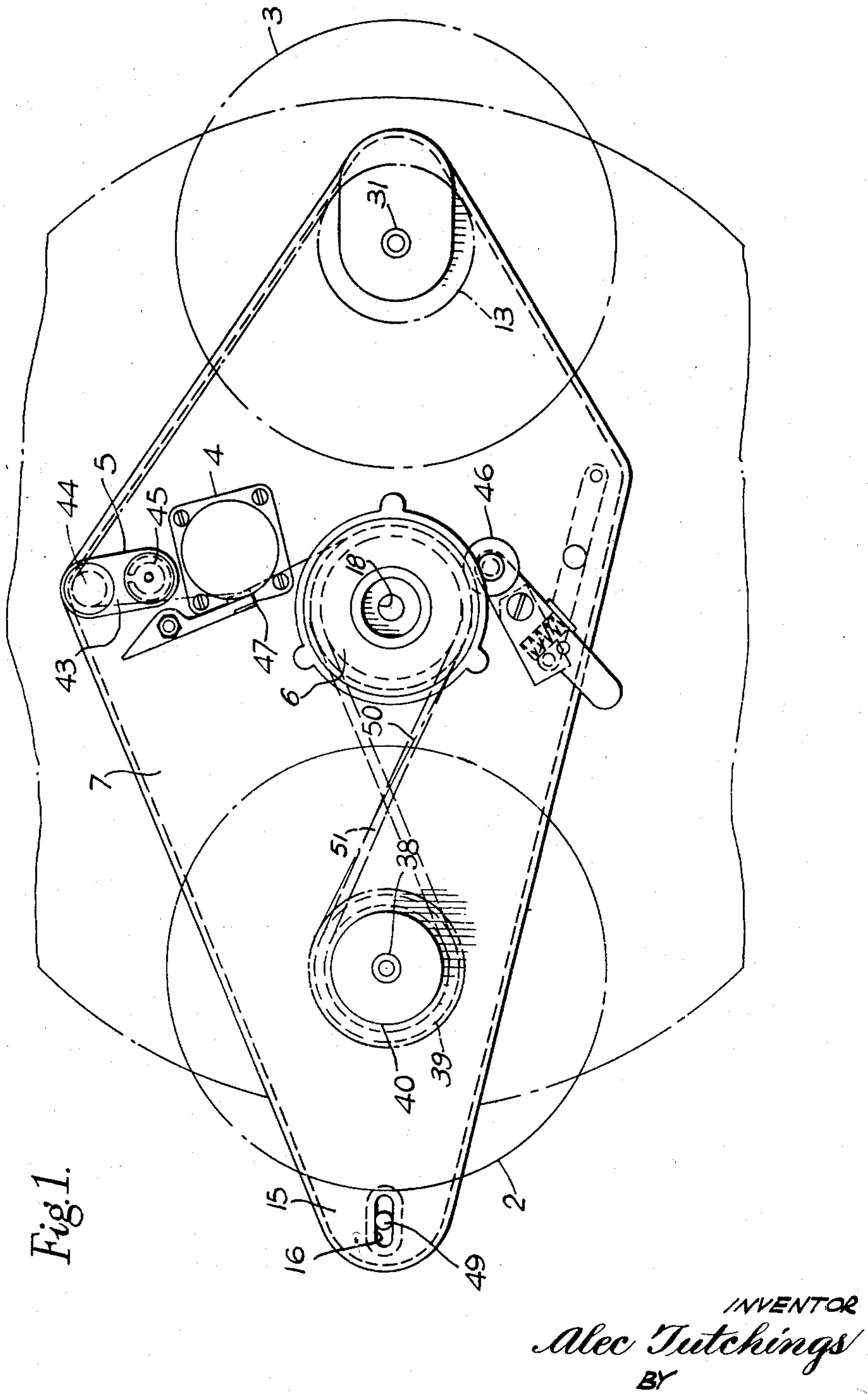
Fig. 1 is a plan view of the unit.

Referring to the drawing, the unit consists essentially of a carrier member or deck 1 supporting reels 2 and 3 of magnetic tape, together with their associated guide elements, a recording and reproducing head 4, an erasing magnet structure 5 and a capstan 6 rotatably mounted on the deck for location upon a gramophone turntable in place of a normal disc type record so as to be rotated with the turntable while the deck is held stationary.

The deck 1 is of generally lozenge shape having a mainly flat upper surface 7 and a downwardly projecting rim 8 and is die cast from an aluminium alloy. The upper surface 7 of the deck is formed with a substantially centrally disposed circular aperture 9 surrounded by an upwardly projecting annular wall 10 having an inwardly extending rim 11 at its upper end together with a supply reel mounting 12 on the longitudinal axis of the deck at one end 13 thereof and a take-up reel mounting 14 on the longitudinal axis of the deck towards the other end 15 thereof. Adjacent the end 15 the deck is formed with an elongated aperture 16 on its longitudinal axis for a purpose to be described later.

The capstan 6 comprises a circular base 17 having a central aperture for engagement over the pin such as 19 which projects upwardly from the centre of a gramophone turntable such as 20. The base 17 is formed integrally with a concentric hollow shaft 21, the lower end of which is thickened and formed with a peripheral groove 22 to constitute a pulley. The upper end of the thickened portion is supported in an anti-friction bearing 23 located as a friction fit within the aperture 9 so that the lower surface 24 of the base 17 projects well below the lower edge of the rim 8 of the deck 1. An annular driving head 25 is securely mounted concentrically on the upper end of the shaft 21 to extend above the upper surface of the deck. The head 25 is formed with a shallow peripheral groove 26 to receive and drive magnetic tape as will be described later.

The supply reel mounting 12 comprises an upwardly projecting annular wall 27 of generally oval shape in plan view formed integrally with the deck 1 and supporting an integrally formed platform 28 extending parallel with the upper surface 7 of the deck. The platform 28 is formed with two circular apertures 29 and 30 located on the longitudinal axis of the deck and spaced apart by a distance equal to the difference in radius between supply reels of two different radii. A pin 31 having a reduced diameter portion 32 at its lower end to be a sliding fit within the apertures is provided at this end with an umbrella-type spring 33 so that the pin may be firmly disposed within either aperture but is capable of ready removal. The pin 31 serves to locate the supply reel 3 of known type the undersurface of which bears upon a friction pad 34 located on the platform 28.

The take-up reel mounting 14 comprises a thickened part of the deck 1 formed with two circular apertures in which bearings 35 and 36 are respectively located. These bearings are spaced apart by a distance equal to the spacing between the apertures 29 and 30 in the supply reel mounting.

A take-up reel pin 37 extends upwardly through the bearing 36 (although it may extend through the bearing 35), and is formed with an upper end 38 for receiving the take-up reel 2, a central part which is a push-fit within the bearing 36, and a lower end on which a pulley wheel 39 is mounted co-planar with the peripheral groove 22 on the capstan 6. A collar 40 is mounted on the pin 37 and carries a friction pad 41 on which the reel 2 rests and the pulley 39 is maintained in position by a spring clip 42 and is coupled with the capstan 6 by an endless driving belt 51 which may for example be of coiled steel wire.

The erasing magnet structure 5 comprises a support 43 pivoted to the deck 1 and carrying a guide pillar 44 and a permanent magnet erase pillar 45. The support 43 is movable through 180° from a first position (shown in Fig. 1) in which the tape extends around the guide pillar 44 to a second position (not shown) in which the erase pillar 45 replaces the guide pillar 44. In both positions of the support 43 spring urged ball catches (not shown) accurately locate the support in its required position. The record/play-back head 4 is mounted between the structure 5 and the capstan 6, the periphery of the record/play-back head intersecting a common tangent to the peripheral groove 26 in the capstan head 25 on the side of the latter adjacent the supply reel 3 and the tape guide pillar 44 on the side of the latter remote from the supply reel 3.

A pivoted, spring controlled pressure roller 46 is mounted on the deck 1 to engage with tape passing around the head 25 in well known manner and a pressure pad 47 is also mounted on the deck 1 adjacent the head 4.

In use the unit is located on the turntable 20 of an existing gramophone installation, the lower surface of the base 17 of the capstan 6 engaging with the upper surface of the turntable in the manner of a disc record to be rotated thereby. In order to prevent the deck 1 rotating with the capstan 6 a pillar 49 is disposed on the deck of the phonograph adjacent the turntable to engage within the aperture 16 in the deck 1. This pillar may, if desired, take the form of a jack and the aperture 16 may be constituted by the opening of a jack holder so that electrical connections to the record/play-back head 4 may conveniently be made. It will be appreciated that with the arrangement described the existing constant speed motor of the gramophone installation, together with the comparatively large mass of the turntable 20, ensures that the capstan 6 is driven at a substantially constant speed. The take-up reel 2 is also suitably driven to receive tape (indicated at 50 (Fig. 1)) passing from the supply reel 3 around the tape guide pillar 44 past the record/play-back head 4 and around the capstan head 25 beneath the pressure roller 46.

It is desirable that the unit should be used in conjunction with the gramophone installation of a radiogram in order that advantage may be taken of the low frequency amplifier incorporated therein both for recording and play-back purposes. If desired, a pre-amplifier (not shown) may be provided to step up the output from the play-back head 4 to a magnitude suitable for feeding to the input of the type of low frequency amplifier usually incorporated in a radiogram.

As a desired modification to the unit the capstan base 17 may be formed with a second peripheral groove (not shown) and the pin 31 for the supply reel 3 mounted in a bearing and provided at its lower end with a pulley so that an endless flexible belt may be engaged between this pulley and said second peripheral groove. This belt is twisted so that the supply reel spindle is constantly rotated in the opposite direction to the supply reel itself during both recording and reproducing.

Figure 2:
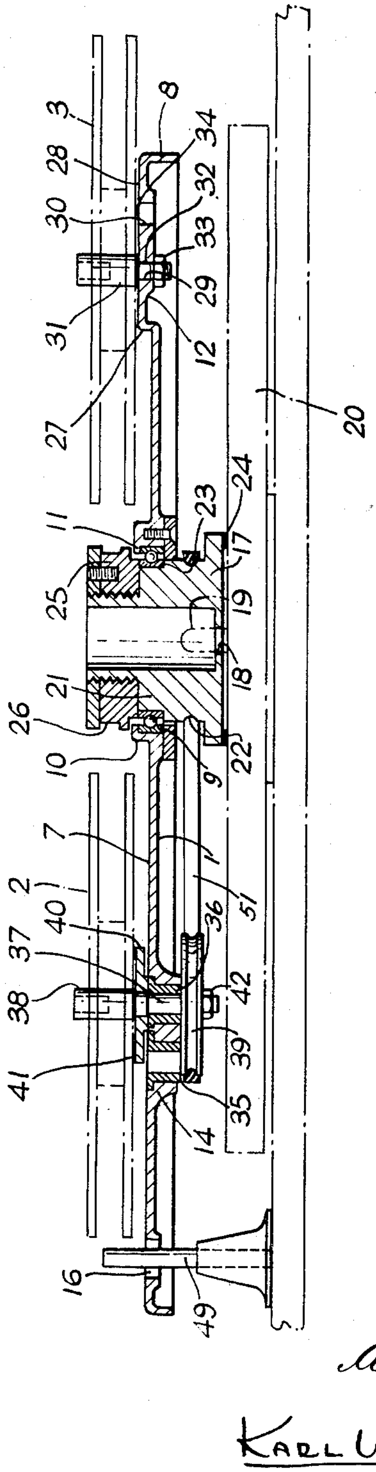
Fig. 2 is a section on the line II—II of Fig. 1.

It is customary on reels for holding magnetic tape that the central spindle hole should be formed with one or more radially outwardly extending recesses and the upper end of the pin 31 may therefore be provided with a pivoting key (not shown) which may be moved by an operator to engage in the recess to lock the supply reel 3 to its pin 31 for rewind purposes. During rewind the tape is preferably disengaged from the guide pillar 44 (or erase pillar 45) and the head 4 and taken directly from the capstan 6 to the supply reel 3. However, as shown in Fig. 2, the pins 31 and 37 are counterbored at their upper ends to receive a hand-operated wind back unit (not shown) which does not form port of the present invention.

It will be appreciated that the present invention provides a magnetic recording and reproducing unit which may readily be used in conjunction with an existing gramophone installation with the minimum alteration thereto and in such a manner that it may readily be interchanged with the usual disc-type records. Further the unit may be changed from one installation to another and recording may be carried out, for example, on a spring-driven turntable using a battery amplifier and the unit then transferred to a radiogram for reproduction. Since the tape is always reproduced on the same head and guide system as that on which it was recorded, high note loss due to gap alignment errors is minimised.

Although the unit has been described above for reproducing tape previously recorded on it, it will be appreciated that it is equally suitable for reproducing commercially recorded tape.

I claim:

1. A magnetic recording and reproducing unit adapted to be driven by the turntable of a phonograph having a deck comprising a carrier member, a supply reel on said member and rotatable about a first axis for holding a quantity of magnetic material, a take-up reel on said member and rotatable about a second axis, driving means for the material located on the path thereof from said supply reel to said take-up reel, means for rotating said take-up reel so that material unwound from the supply reel is wound thereon, a recording head on said member for cooperation with said material between said supply reel and said driving means, a part of said driving means being positioned for cooperation with a turntable of an existing phonograph installation so that the unit may be disposed on a turntable in the manner of a disc type record, and means for restraining rotation of said member with the turntable and permitting restricted tilting movement of said member with the turntable relatively to the deck of the phonograph in any direction.

2. A magnetic recording and reproducing unit adapted to be driven by the turntable of a phonograph having a deck comprising a carrier member, a supply reel on said member and rotatable about an axis for holding a quantity of magnetic material, a take-up reel pin on said member and displaced from said axis, a take-up reel on said pin, driving means for the material located on the path thereof from said supply reel to said take-up reel, means coupling said driving means with said take-up reel pin for rotating said take-up reel so that material unwound from the supply reel is wound thereon, a recording head on said member for co-operation with said material between said supply reel and said driving means, a part of said driving means being positioned for co-operation with a turntable of an existing phonograph installation so that the unit may be disposed on a turntable in the manner of a disc type record, and means for restraining rotation of the member with said turntable and permitting restricted tilting movement of said member with the turntable relatively to the deck of the phonograph in any direction.

3. A magnetic recording and reproducing unit according to claim 2 in which said means for coupling said driving means with said take-up reel pin comprises a pulley on said pin and an endless driving belt engaging therewith and with part of said driving means.

4. A magnetic recording and reproducing unit adapted to be driven by the turntable of a phonograph having a deck; comprising a carrier member, a mainly flat upper surface on said member, a supply reel rotatably supported by said member above said surface for holding a quantity of magnetic material, a take-up reel rotatably supported by said member above said surface, driving means for the material located on the path thereof from said supply reel to said take-up reel, means for rotating said take-up reel so that material unwound from the supply reel is wound thereon, a recording head on said member for co-operation with said magnetic material between said supply reel and said driving means, a capstan coupled with said driving means and disposed beneath said member for co-operation with a turntable of an existing phonograph installation so that the unit may be disposed on a turntable in the manner of a disc type record, and means remotely positioned from said capstan for restraining rotation of said member with said turntable and permitting restricted tilting movement of said member with said turntable in any direction.

5. A magnetic recording and reproducing unit according to claim 4 comprising a support pivoted to the carrier member, a guide pillar and a permanent magnet erase pillar mounted on said support and means for moving said support through 180° from a first position in which said magnetic material passing from one of said reels to the other may extend around said guide pillar to a second position in which said material may extend around said erase pillar.

6. In a magnetic recording and reproducing installation, a deck, a turntable thereabove, means for driving said turntable at a substantially constant speed, a carrier member, reels carrying magnetic material together with associated guide elements on said member, a recording and reproducing head on said member, an erasing magnet structure on said member, driving means for said material, a capstan coupled with said latter mentioned driving means located axially on said turntable to thereby be driven by said turntable and to thereby drive said material driving means, and means for restricting rotation of said member with said turntable and permitting tilting movement thereof relatively to the deck of the installation.

References Cited in the file of this patent

UNITED STATES PATENTS

| | | |
|---|---|---|
| 1,803,403 | Owens | May 5, 1931 |
| 2,029,730 | Mallina | Feb. 4, 1936 |
| 2,084,947 | Czeija et al. | June 22, 1937 |
| 2,490,771 | Begun | Dec. 13, 1949 |
| 2,625,611 | Roberts | Jan. 13, 1953 |
| 2,633,362 | Camras | Mar. 31, 1953 |
| 2,694,110 | Roberts | Nov. 9, 1954 |
| 2,694,577 | Ninni | Nov. 17, 1954 |
| 2,828,367 | Sibbet | Mar. 25, 1958 |